Nov. 25, 1924.　　　　　　　　　　　　　　　　　　1,516,713
A. D. COLE
REIN CONTROLLED STEERING AND GEAR SHIFTING ATTACHMENT FOR TRACTORS
Filed Oct. 7, 1920　　　3 Sheets-Sheet 1
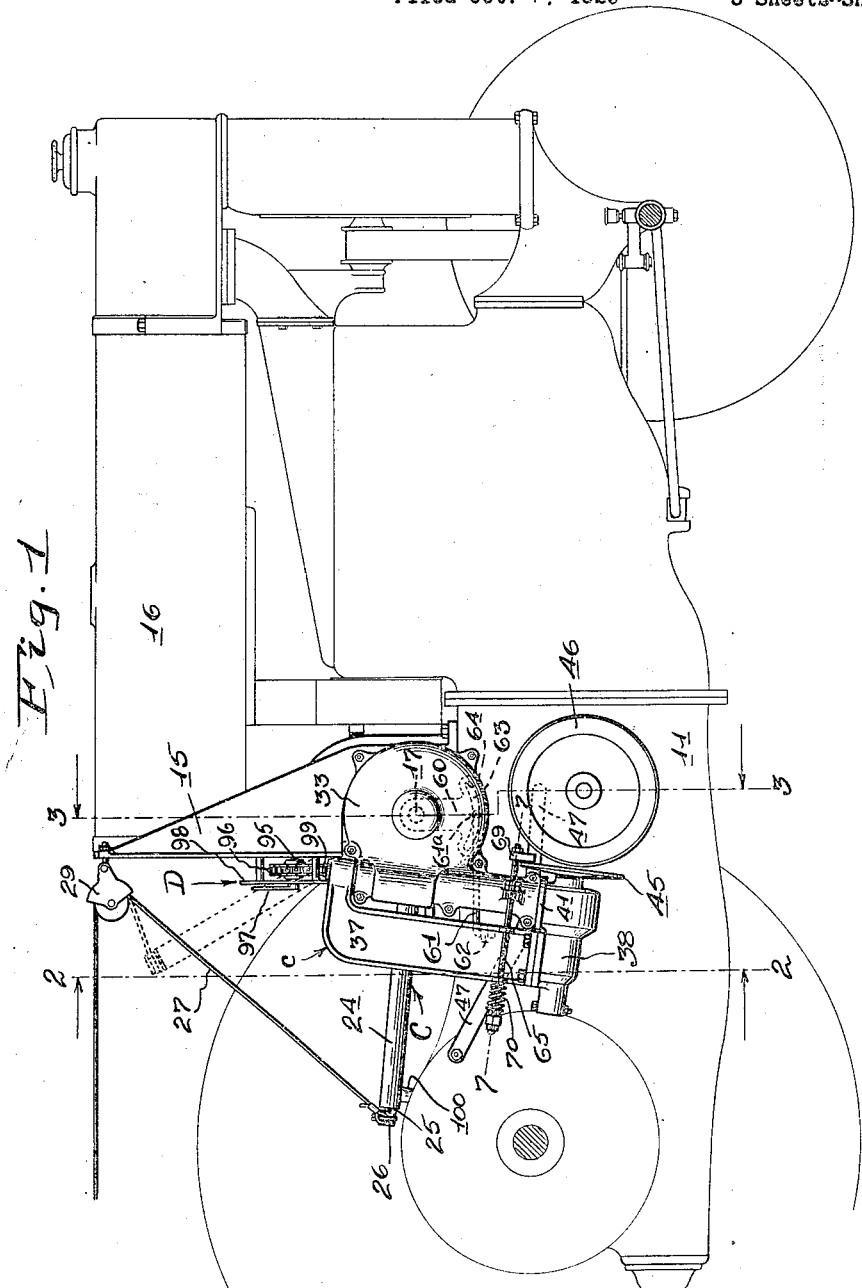
Inventor
Arthur Dennis Cole
By Bradbury + Caswell
Attorneys Nov. 25, 1924.  
A. D. COLE  
1,516,713  
REIN CONTROLLED STEERING AND GEAR SHIFTING ATTACHMENT FOR TRACTORS  
Filed Oct. 7, 1920  3 Sheets-Sheet 2
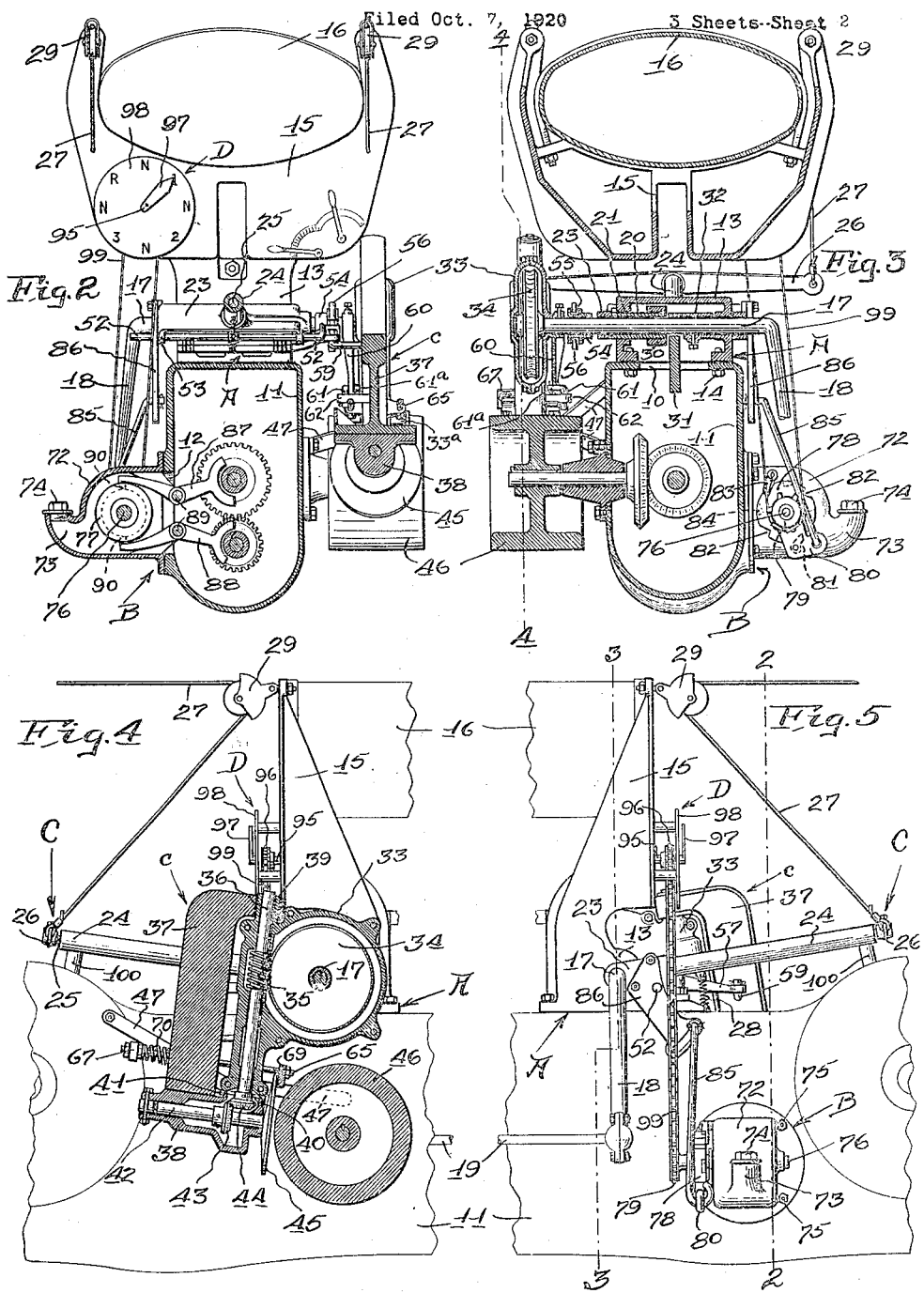
Inventor  
Arthur Dennis Cole  
By Bradbury & Caswell  
Attorneys Nov. 25, 1924. 1,516,713
A. D. COLE
REIN CONTROLLED STEERING AND GEAR SHIFTING ATTACHMENT FOR TRACTORS
Filed Oct. 7, 1920 3 Sheets-Sheet 3
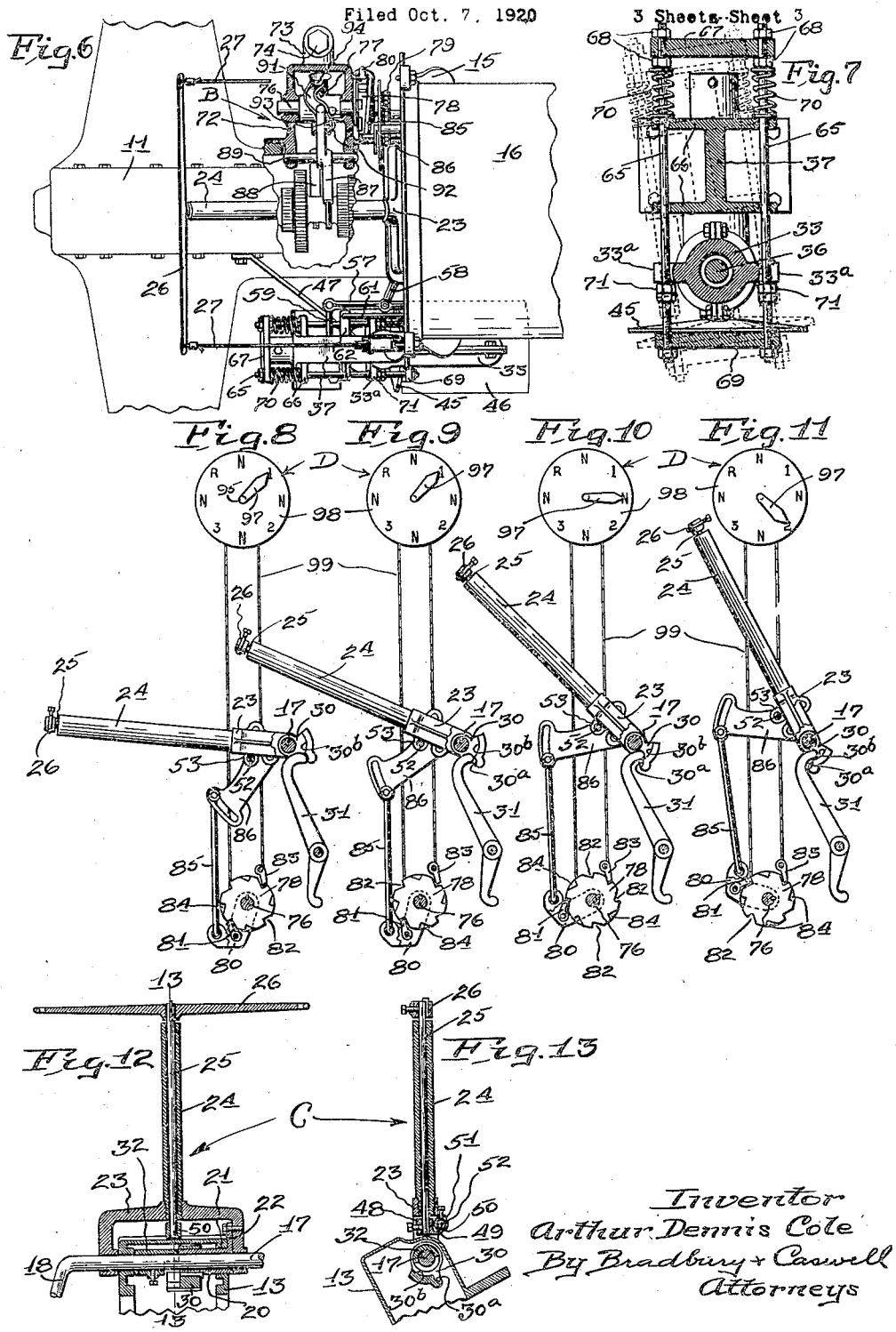

Patented Nov. 25, 1924.

1,516,713

UNITED STATES PATENT OFFICE.

ARTHUR DENNIS COLE, OF MINNEAPOLIS, MINNESOTA.

REIN-CONTROLLED STEERING AND GEAR-SHIFTING ATTACHMENT FOR TRACTORS.

Application filed October 7, 1920. Serial No. 415,348.

*To all whom it may concern:*

Be it known that I, ARTHUR DENNIS COLE, a citizen of the United States, residing in Minneapolis, in the county of Hennepin and State of Minnesota, have invented a new and useful Rein-Controlled Steering and Gear-Shifting Attachment for Tractors, of which the following is a specification.

My invention relates to improvements in rein controlled steering and gear shifting attachments for tractors.

Its object is to provide a simple, durable and efficient attachment, particularly though not exclusively, for Fordson tractors, adapted to be readily applied and including a pair of reins or lines with mechanism connected therewith, whereby upon manipulation of said pair of reins, the steering wheels of the tractor may be turned in either direction, the clutch of the tractor operated and the gears of the transmission shifted, as desired.

A further object is to provide a device of this kind having a single rein controlled actuating element through which a tractor clutch is operated, the gears thereof shifted and its steering wheels turned.

Another object is to supply a rein controlled device of this nature having an indicator to designate the relation of the gears in the transmission mechanism.

Another object is to supply a rein drive attachment for tractors employing the power mechanism thereof as the driving medium for changing the direction of its steering wheels.

With the foregoing and other objects in view, which will appear in the following description, the invention resides in the novel combination and arrangements of parts and in the details of construction hereinafter described and claimed.

In the drawings Fig. 1 is a side elevation of a tractor illustrating one embodiment of my improved attachment applied thereto; Fig. 2 is a detail sectional view taken on the line 2—2 of Fig. 1; Fig. 3 is a similar view taken on the line 3—3 of Fig. 1; Fig. 4 is a detail sectional view taken on the line 4—4 of Fig. 3; Fig. 5 is an elevation of my improved device, illustrating the side thereof opposite that shown in Fig. 1, the lines 2—2 and 3—3 corresponding respectively with the similarly identified section lines in said Fig. 1; Fig. 6 is a plan view of my improvement and associated tractor parts, portions of which are broken away to disclose interior structures; Fig. 7 is an enlarged sectional view taken on the line 7—7 of Fig. 1; Figs. 8, 9, 10 and 11 are diagrammatic views showing the rein controlled actuating element in various oscillatory positions, also the various corresponding positions of mechanism operated thereby; Fig. 12 is a longitudinal central sectional view of said element and Fig. 13 is a similar view taken on the line 13—13 of Fig. 12.

Referring to the drawings, let the reference letters A and B indicate the two plates, which are respectively employed in lieu of the steering gear plate and gear shifter plate, standard in Fordson tractors. It will be understood that the usual steering gear plate covers an opening 10 in the top of the transmission housing 11 and forms a mounting for the ordinary clutch actuating devices and the shaft and gears of the steering mechanism. The usual gear shifter plate covers an opening 12 in the side of said transmission housing 11 and in addition to supporting gear shifters, it is provided with an oil filler cap. In adapting my device to a tractor, I dispense with the original steering gear and gear shifter plates and the mechanism carried thereby. My plate A includes a housing 13, which is attached by means of the original machine bolts 14 to the transmission housing 11 and closes the opening 10 in the top thereof. Integral with said housing 13 is an upright frame 15 designed, among other things, to carry the fuel tank 16 of the tractor. Passing transversely through said housing 13 (Fig. 3) is a shaft 17, one end 18 thereof being turned downward and attached at its extremity to the drag-link 19 of the tractor. A sleeve 20, revoluble on said shaft 17 and journaled in a bearing 21 in one side of said housing 13, is formed with an arm 22 (Fig. 12) outside of the housing. This arm is secured to one of the branches of a yoke 23, embracing the housing 13 and journaled at the extremities of said branches on said shaft 17. A hollow arm 24 threaded at one end in said yoke 23, revolubly contains a tiller shaft 25, the outer end thereof being supplied with a cross piece or tiller bar 26, to the ends of which a pair of reins 27 are attached. Said arm is yieldingly swung to one extreme by means of a spring 28 (Fig. 5), and is tilted to the other extreme, against the action of said spring, through slightly less than ninety degrees and into substantially upright position, by the reins 27, said reins being passed upwardly through pulleys 29 on the frame 15 and thence to the operator, who may assume any desired position within reach of the reins. The pulling or slackening of said reins equally and simultaneously results in swinging the arm 24, while unequal pulls upon one or the other of said reins results in shifting the tiller bar 26 in the various oscillatory positions of said arm. The swinging movements of the arm 24 are employed to operate the tractor clutch and also to shift the gears of the tractor, while the turning movements of the tiller bar 26 are employed to actuate steering mechanism, which is propelled by a power driven element on the tractor. I have chosen to call the assembled yoke 23, arm 24, tiller 25 and tiller bar 26 an actuating element and have designated said element by the letter C.

Upon the inner end of the sleeve 20 (Figs. 3, 12 and 13), I apply a cam 30, designed to engage the upper end of the usual clutch lever 31. A collar 32 fixed on the shaft 17 between said sleeve 20 and the opposite side of the housing 13, locks said shaft 17 against endwise movements in said housing. The end of the shaft 17 opposite said downturned arm 18 carries a casing 33, which is journaled at one side thereon. A worm wheel 34 (Fig. 4) fixed to said shaft 17 and enclosed within said casing 33 meshes with a worm 35 on an upright worm shaft 36 journaled in the casing 33. A hanger c, comprising a bracket 37 and a casing 38 depending from said bracket, is pivotally carried on the casing 33 so as to swing on the axis of the worm shaft 36. In the present instance, the bracket 37 is provided with an arm journaled on a boss 39 of the casing 33 in which boss the upper end of the worm shaft 36 is journaled. The casing 38 is provided with an upright annular flange 40 machined to turn within a depending annular flange 41 formed, concentrically with the axis of the worm shaft 36, on the companion casing 33. A shaft 42 journaled at its ends in the casing 38 is driven by the worm shaft 36 through intermeshing bevel gears 43 and 44, the former being fixed on said shaft 42 and the latter on the lower end of said worm shaft 36. A disk 45 on one end of said shaft 42 is adapted to be swung into frictional engagement with a power driven element of the tractor, such as the power pulley 46 illustrated herein. The casing 33 is normally fixed by means of straps 47 adjustably secured thereto and anchored to the frame of the tractor. Said straps are normally adjusted so that the driving disk 45 barely clears the face of the pulley 46, when the hanger c rests in a plane at right angles to the axis of said pulley. The tilting of the hanger c in opposite sidewise directions by mechanism soon to be described, results in engaging opposite sides of the disk 45 with the pulley 46, whereupon the drag-link shifter-shaft 17 is turned forward and backward. Said sidewise swinging movements of the hanger c are imparted thereto from the tiller shaft 25 (Fig. 13). The inner extremity of said shaft 25 lies between the branches of the yoke 23 and fixed on said extremity of said shaft is a collar 48 formed with an integral lug 49, which rests in a depression 50 in a collar 51 rigidly secured to a rod 52 slidable in bosses 53 on the branches of the yoke 23. The end of said rod 52, adjacent to the hanger c (Fig. 2), is turned inward and secured at its extremity to a collar 54 revolubly and slidably mounted on the shaft 17. Said collar is formed with an annular groove 55 therein to receive the forked end 56 of a shifting lever 57 (Fig. 6), which is pivotally supported near the middle thereof upon an arm 58 on the plate A and connected at its extremity opposite said forked end with a lug 59 on the bracket 37. Turning movements of the tiller shaft 25, by means of the reins 27, are transmitted through the rod 52, collar 54 and lever 57 to the hanger 37, thus resulting in sidewise swings of said hanger and the consequent engagement of the opposite outer margins of the disk 45 with the pulley 46. The worm 35 and worm wheel 34 are so designed that a pull upon the right rein results in turning the steering wheels of the tractor to the right and a pull upon the left rein results in turning said steering wheels to the left. The slidable revoluble collar 54 as an element in the connection between the tiller shaft 25 and hanger 37 provides for converting the rotary movements of the former into swinging movements of the latter in all of the various angular positions of the arm 24. The straps 47 above described also serve to hold the casing 33 in such angular position on the shaft 17 as to permit the free movement of a belt between the disk 45 and pulley 46.

I provide for automatically limiting the turning of the steering wheels beyond predetermined positions. This result is accomplished by means of a slotted quadrant 60 rigidly secured to the shaft 17 and supplied with a link 61, which is slidably fitted at one end in the slot 63 in said quadrant and pivotally attached at its other end to a lug 62 on the bracket 37. The length of the slot 63 in the quadrant 60 determines the throw of the arm 18 on the shaft 17 and necessarily the extent to which the steering wheels may turn. For example, assume that the hanger 37 (Fig. 1) is swung to the left by a pull upon the appropriate rein. The motion of the power pulley is transmitted to the drag-link shifter-shaft 17 and the quadrant 60 thereon is swung rearwardly. The abutment 64, at the forward end of the slot 63, strikes the inturned extremity 61ª of the link 61 and through said link swings the hanger 37 back into normal position, wherein the disk 45 is disengaged from the pulley 46. This return movement of the hanger 37 is accomplished against normal resistance upon the rein and automatically prevents the cramping of the steering wheels. Should the driver fail to diminish the pull upon the rein to meet with the straightening movement of the hanger, the arm 24 will be lifted against the action of the spring 28, thus resulting in promptly throwing out the clutch and stopping the tractor.

I provide a yielding brake adapted to engage the disk 45 and arrest the rotation thereof, as the same is removed from frictional contact with the pulley 46. This feature is adapted to avoid unpremeditated turning of the tractor steering wheels caused through the momentum of the steering mechanism after disengagement of the disk 45 from said pulley 46. Referring to Fig. 7, the details of my braking device will be readily observed. Two rods 65, slidably supported in webs 66 on the bracket 37 are rigidly joined at their rear ends by a tie piece 67 interposed between nuts 68 on said rods. The forward ends of the rods 65 carry a brake bar 69, which is caused to bear against the upper margin of the disk 45 by the action of spiral springs 70 encircling the rods 65 and interposed between the bracket 37 and said inner nuts 68. The rods 65 pass between ears 33ª on either side of the housing 33 and stop nuts 71 on said rods are employed to severally engage the forward faces of said ears, when the hanger 37 is turned to one side or the other out of normal position. It will be remembered that the housing 33 remains fixed with respect to the axis of the worm shaft 36, while the hanger 37 pivots thereon. In the normal position of the hanger (solid lines Fig. 7), the stop nuts 71 rest closely adjacent to the ears, being only sufficiently removed therefrom to permit a firm grip of the brake bar 69 upon the disk 45. The tilting of the hanger 37 toward position engaging the disk 45 with the pulley 46 (dotted lines Fig. 7) results initially in engaging one of the stop nuts 71 with the adjacent ear 33ª and later in pivoting the braking device at such point of engagement. Said stop nut 71 retains the braking device against retraction by the springs 70 and the brake bar 69, due to the tilted position of the braking device, clears the disk 45. The return of the hanger 37 to normal position is accompanied by the reengagement of the braking bar 69 and disk 45.

The cam 30 on the shaft 17 is formed with an inclined actuating surface 30ª and a holding surface 30ᵇ, the latter being concentric with the axis of the shaft 17. Said cam is fixed upon said shaft 17 so that when the arm 24 is in its lowermost position (Fig. 8) the upper end of the clutch lever 31 bears against the lower portion of the cam surface 30ᵇ. Diverting for the moment, it will be understood that the clutch lever 31 is a part of the tractor, the upper end of said lever being yieldingly urged forward by the usual mechanism. In the position of the clutch lever 24, just described, (Fig. 8) the clutch members are in operative relation. Said cam surface 30ᵇ is of such length and inclination that upon a slight initial elevation of the arm 24 (Fig. 9), the upper end of the lever 31 is thrown rearwardly sufficiently to disconnect the clutch members and engage said end of said lever with the lower margin of the holding cam surface 30ª. Thus it will be seen that by manipulating the reins 27 so as to slightly elevate the arm 24, the clutch members of the tractor are disengaged, said members being so fixed in further elevating the arm 24 or in lowering the same to said described position (Fig. 9). To permit the arm 24 to fall beneath in clutching position (Fig. 9) causes the reengagement of the tractor clutch members.

Having particularly described the mechanism for steering the tractor and operating the clutch thereof, it remains to point out the details of the gear shifting mechanism, which, like the steering mechanism and clutch actuating mechanism, is operated from the single rein controlled actuating element C.

My gear shifter plate B includes a housing 72 formed with an oil filler opening 73 and cap 74 therefor. Said plate B is substituted for the usual gear shifter plate and is secured in position covering the opening 12 in the side of the transmission housing 11 by means of the original machine bolts 75. A shaft 76 is journaled transversely in the housing 72, a cam 77 being secured on said shaft within said housing and a ratchet wheel 78 and sprocket wheel 79 being fixed to said shaft 76 outside of the housing. A rocker arm 80 pivoted on said shaft 76, carries a spring pressed pawl 81 adapted to engage only in four equally spaced notches 82 cut through the entire width of the sprocket wheel 78. A spring pressed pawl 83 pivoted on the housing 72 is adapted to prevent backward rotation (clockwise movement, Fig. 3) of the ratchet wheel 78, by engaging not only said wide notches 82, but also four equally spaced narrow notches 84, which are formed in said ratchet wheel midway between said wide notches 82. Said arm 80 is oscillated to turn the cam shaft 76 through the medium of a link 85 pivotally connected at its lower end with said arm 80 and slidably and pivotally connected with a lever 86 fixed to the yoke 23 on the actuating element C. Upper and lower gear shifters 87 and 88 applied at their inner ends in the usual manner to the sliding gears of the tractor transmission mechanism are slidably mounted on rods 89 carried by the plate B, the outer ends of each of said gear shifters being supplied with a roller 90. The cam 77 is provided with a way in the periphery thereof, which receives said rollers in diametrically opposed positions. This way has two opposed shifting sections 91 and 92 (Fig. 6) formed in adjacent quarters on one side of the cam and separated by a short neutral section 93 which corresponds with the semi-circular neutral section 94 on the opposite side of said cam. Thus it will be seen that during one-eighth of a revolution of said cam one of said gear shifters is moved from neutral position to one extreme or from one extreme back to neutral position, while the other gear shifter remains in neutral position. The cam way being so shaped, shifts the transmission mechanism progressively through the low, intermediate, high and reverse gears and insures the neutral positioning thereof preparatory to each change. An indicator D for showing the positions of the transmission gears includes a pointer shaft 95 revolubly mounted on the frame 15 and fitted with a sprocket wheel 96 and a pointer 97, the latter being designed to turn in front of a dial 98 also mounted on said frame 15. The sprocket 96 on the dial shaft 95 and the sprocket 79 on the cam shaft 76 are identical and are connected by a sprocket chain 99. The dial 98 has four equally spaced symbols designating first, second and third speeds and reverse, all corresponding respectively with the four positions of the cam 77, as acquired in tilting the arm 24 forward and backward four successive times. One quarter turn of said cam is illustrated in Figs. 9, 10 and 11. In the former the tractor is in first speed. By throwing the arm 24 forward toward position in Fig. 10, and turning the cam one-eighth of a revolution, the transmission gears are shifted to neutral position. Continued forward movement of the arm 24 completes the quarter turn of the cam 77, thus causing the meshing of the gears, wherein the next or second speed is attained. Midway between each gear symbol on the dial 98 is a neutral sign designating to the driver the instances in which the transmission gears are in neutral relation. The locking pawl 83 engages both sets of notches 82 and 84 in the ratchet wheel 78 while the driving pawl 81 engages only in the notches 82 of said ratchet wheel. The initial forward movement of the arm 24 has no effect upon the position of the cam 77, due to the slidable connection between the lever 86 and link 85. Movement of said arm 24 forward of position shown in Fig. 9, however, causes the cam 77 to turn and completion of said forward movement results in turning said cam through ninety degrees, as above explained. In the operation of the tractor at a given speed, ahead or in reverse, the arm 24 rests in depressed position upon a stop 100 on the tractor housing 11. Fig. 8 illustrates such position of the said arm. To merely unclutch the motor, the arm 24 is lifted by the reins 27 to position shown in Fig. 9. Such shifting of the arm has no effect upon the position of the cam 77 and said arm may be permitted to fall back and again throw in the clutch, whereupon the tractor will move at the original speed forward or in reverse, as the case may be. To shift the gearing of the transmission into neutral relation, it is only required to raise the arm 24 into position shown in Fig. 10. Should the driver wish to drop his reins at this time, he may safely do so, since the return of the arm to fully depressed position and the consequent engagement of the clutch members can have no effect in so far as propelling the tractor is concerned. To advance to the next speed, the arm 24 must be completely raised. At the position of the arm 24, as illustrated in Fig. 10, the driving pawl 81 again strikes the notch 82 with which it was last engaged and upon completion of the stroke of said arm (Fig. 11), the cam 77 reaches the end of one of its quarter turns, thus changing the gear ratio in the transmission. Return of the arm 24 to its lowermost position reengages the clutch members and the tractor is propelled at a new speed. The cam 77 and the slidable connection between the link 85 and lever 86 are so related that the clutch members of the tractor are constantly disengaged through the action of the clutch lever 31 during the intermeshing of the transmission gears.

From the above, it is seen that by the manipulation of two reins, the single actuating element C is caused to operate the tractor clutch, shift the gears thereof and actuate the mechanism, which is driven by power to steer the tractor.

Changes in the specific form of my invention, as herein disclosed, may be made within the scope of what is claimed without departing from the spirit of my invention.

Having described my invention, what I claim as new and desire to protect by Letters Patent is:

1. In an attachment of the class described, two parts designed for application to the body of a tractor, one part carrying gear shifters and an actuating cam therefor, while the other part carries steering mechanism adapted to be propelled by a moving part of the tractor, also a clutch throw-out device and an actuating member, said actuating member being adapted to operate said gear shifter cam and clutch throw-out device and, further, to actuate said steering mechanism.

2. In a device of the class described, gear shifting mechanism, a clutch throw-out device and steering mechanism for a tractor, said steering mechanism being designed to be driven by a moving member of the tractor and having a hinged element arranged to engage said member and turn said steering mechanism in reverse directions, and a rein controlled actuating element designed to operate said gear shifting mechanism and clutch throw-out device; also to actuate said hinged member of said steering mechanism.

3. In an attachment for a tractor, a drag-link shifter-shaft, a friction disk adapted to be tilted into engagement with and disengaged from a power driven element of the tractor, driving mechanism between said disk and shaft, a yielding brake for the disk adapted to become operative, automatically, upon the disengagement of said disk from said power driven element, gear shifting mechanism, a clutch throw-out device, an actuating element carried on said shifter-shaft and designed to tilt said disk and operate said gear shifting mechanism and clutch throw-out device.

4. The combination with a tractor having a variable geared transmission and clutch throw-out lever, of a rocking actuating member having two ranges of movement, the first for clutch actuation and the second for gear actuation, a gear shifting cam, connecting means between said cam and member for progressively turning the former, said cam being arranged to shift the transmission gears from operative through neutral and into another operative relation upon movement of said member through its gear actuating range, and means connecting the actuating member and clutch lever to render the clutch operative in the first range and inoperative in the second range of movement of said member.

5. The combination with a tractor having a variable geared transmission, of a rocking actuating member, a rein for swinging the actuating member at a distance therefrom, a gear shifter cam, connecting means between said cam and member for progressively turning the former, an indicator within view of the driver and operating means for the indicator, said means being propelled in unison with said cam and adapted to indicate the prevailing relation of the transmission gears.

6. The combination with a tractor having a variable geared transmission, a clutch throw-out lever and steering mechanism, an actuating member including a pivoted support, a tiller on said support and a pair of tiller reins for rocking both the support and tiller, said member having two ranges of movement, the first for clutch actuation and the second for gear actuation, a gear shifting cam, connecting means between said cam and member for turning the former, connecting means between the actuating member and clutch lever and connecting means between the tiller and steering mechanism, said reins serving to actuate said steering mechanism throughout the two ranges of movement of said actuating member.

7. An attachment of the class described, including a top plate and a side plate for a tractor housing, said top plate being supplied with an oscillatory member, a clutch throw-out device actuated thereby and steering mechanism for the tractor, also actuated by said member, said side plate being supplied with gear shifters and an actuating cam therefor, and connecting means between said cam and oscillatory member for operating the former.

8. In an attachment of the class described, a top plate, a transverse shaft revoluble therein and formed with a down-turned arm designed to be connected with the drag-link of a tractor steering mechanism, an arm pivoted on said shaft, a cam attached to said arm and designed to operate the clutch throw-out lever of the tractor, driving mechanism for said shaft carried thereon and adapted to be engaged with and disengaged from a power device on the tractor, whereby reverse motions may be imparted to said shaft, a tiller shaft revoluble in said arm, a tiller bar on said shaft, a pair of reins attached to said tiller bar and adapted to oscillate said arm and turn said tiller shaft, connecting means between said tiller shaft and driving mechanism, a side plate, gear shifters thereon, a cam to move said gear shifters, and connecting means between said arm and cam for turning the latter.

9. In a device of the class described, a steering mechanism for a tractor designed to be thrown into and out of gear with a moving member of the tractor, and a brake for said steering mechanism automatically operable when said mechanism is freed from said moving member.

In testimony whereof, I have signed my name to this specification.

ARTHUR DENNIS COLE.